June 19, 1962          M. PEVAR          3,040,164
COMPOSITION AND PROCESS FOR INSPECTION OF AUTOGENOUS WELDS
Filed Nov. 12, 1958
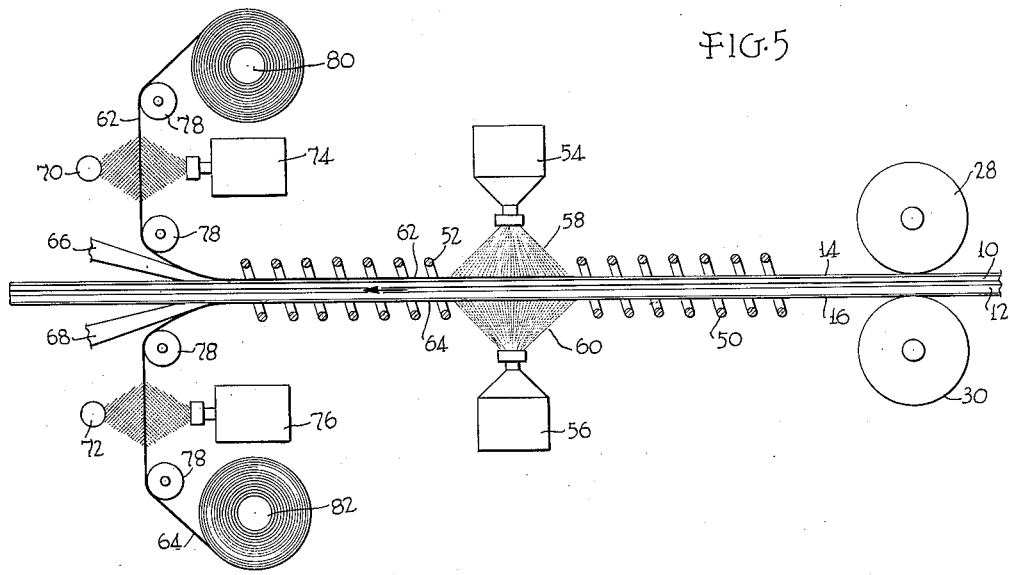
FIG. 5
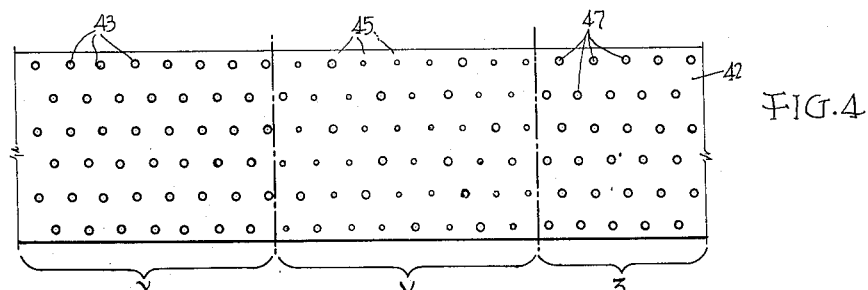
FIG. 4
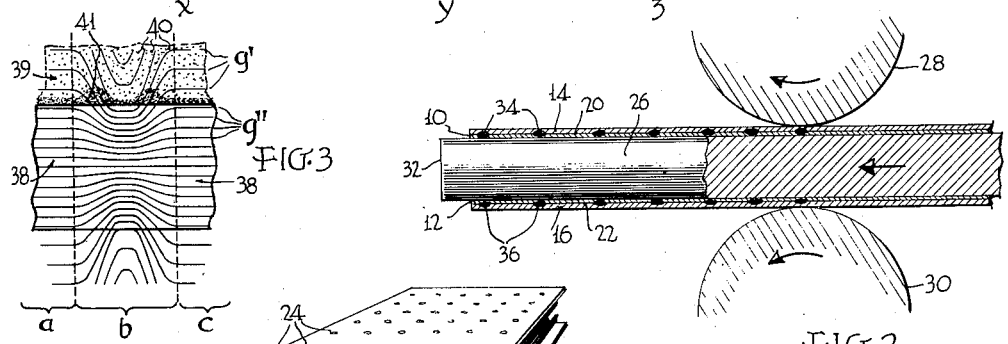
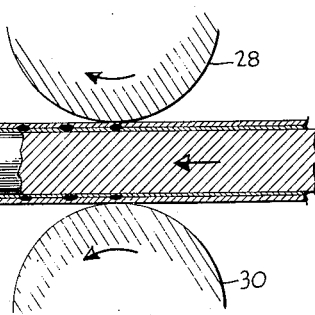
FIG. 2.
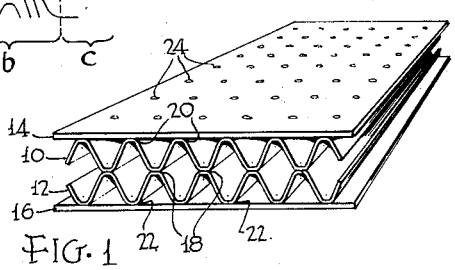
FIG. 1
INVENTOR
Maxwell Pevar
BY
ATTORNEY

United States Patent Office

3,040,164
Patented June 19, 1962

3,040,164
COMPOSITION AND PROCESS FOR INSPECTION OF AUTOGENOUS WELDS
Maxwell Pevar, 8116 Fayette St., Philadelphia, Pa.
Filed Nov. 12, 1958, Ser. No. 773,393
13 Claims. (Cl. 219—83)

This invention pertains to a non-destructive inspection process and a composition useful therein, whereby the parameters of autogenous welds within extended areas of a metallic workpiece may be investigated for determination of weld efficiency, and, more particularly, to such an inspection process and composition for permanent recordation of areal weld parameter information from stabilizing resistance welds in alloy steel sheet-metal sandwich structures.

Autogenous welds are those welds made by fusion of the parent metal of the workpiece components without the addition of any other metal. Such welds are generally made by resistance welding and are used extensively in the fabrication of sheet metal sandwich structures. Sandwich structures comprise core members, corrugated or cellular, and planar skin members integrally attached at a multiplicity of welding positions within their extensive areas. The attachment welds may be considered as stabilizing welds since their purpose is to make an integral structure from the several components of the sandwich and to resist shearing forces. The attachment welds are to be distinguished from structural welds in that the efficiency of the attachment depends upon the strength contributed over an area by many welds rather than depending upon any single weld. Critical inspection information is of weld nugget area at the interface between workpiece components.

In this specification, the term "alloy steel," is used according to the widely recognized definition stated in "The Metallography and Heat Treatment of Iron and Steel," Albert Sauver, McGraw-Hill Book Company, New York, 1943. Alloy steel distinguishes from so called carbon steel and pertains to those paramagnetic ternary and quaternary steels having an austenitic or martensitic structure at ambient temperatures. Austenitic and martensitic refer to the crystalline structure of the steels, the former comprises a faced-centered cubic crystalline lattice and exhibits minimum magnetic permeability while the latter is body centered cubic and exhibits a slightly higher magnetic permeability.

Resistance welded sandwich structures have become extremely important for application to high velocity missiles and airframes. These structures offer a high strength to weight ratio and a high mechanical integrity at the extreme temperatures of supersonic applications. A critical problem deterring general acceptance of these structures has been the lack of a practical non-destructive inspection method for determining weld parameters. Certain inspection techniques are known which indicate mechanical defects, e.g. voids and cracks, and physical or density variations, e.g. non-homogeneities and spurious inclusions, in the weld area. The present problem, however, is to determine the areal extent of weld nugget bond at internal interfaces. Since no mechanical or physical distinction exists to delineate the weld nugget from parent metal, prior investigations have been diverted to various complicated and expensive alternatives, but without achieving the prerequisite reliability for general acceptance.

Hardened workpiece materials prior to welding may be classified generally as cold-worked, precipitation hardened or quenched. Cold-worked steels include those austenitic steels in which hardening is accompanied by grain distortion and, in some cases, the formation of martensite. Fusion of the weld nugget causes a transformation of included martensite to austenite and produces a cast, columnar or dendritic, grain pattern. Precipitation or age hardened steels comprise those austenitic or martensitic steels in which secondary phase ferrites or carbides are included in the microstructure of the workpiece, the inclusions being put into solution in the fused volume of a weld nugget. Quenched martensitic structures have a strained granular microstructure which is altered within the fused volume of the weld nugget. Carbon steels, ferromagnetic with high magnetic permeabilities, are similarly granular in microstructure and exhibit permeability changes upon alternation of the granular structure from an original wrought state to a cast state within the fused volume of a weld nugget.

Each of the microstructure changes occurring upon the formation of a weld nugget is necessarily accompanied by magnetic permeability variations within the material of the workpiece in the vicinity of the welding position. Such variations between fused and unfused workpiece zones may define weld nugget parameters. However, certain masking effects such as retention of parent metal properties at the workpiece surface immediately beneath externally cooled welding electrodes and creation of a heat affected volume independent of fusion make the correlation difficult.

The problem solved by this invention is distinguished from the detection in ferromagnetic materials of physical and mechanical discontinuities which are accompanied by the creation of magnetic poles in a magnetic flux field. Magnetic pole formation generally is explained as requiring aggregates of some $10^{15}$ atoms which associate together in a magnetic domain with a significant resultant magnetic moment. Such domains are readily aligned by a magnetic field to produce magnetic poles.

Magnetic permeability $\mu$ at a point within a material, is defined as the ratio of B, the magnetic flux density within an incremental volume of the material at that point, to H, the field intensity of the environmental magnetic field. Magnetic permeability varies with temperature, with crystalline structure changes, and with the granular microstructure within a given material. As referred to herein, granular microstructure pertains to the lack or presence of grain distortions of the type produced by thermal or mechanical stresses during the preparation of workpiece materials, and altered or relieved in the cast or fused volume of a weld nugget.

While there have been processes for detecting magnetic pole patterns there has been no practical processes or means for correlation of magnetic permeability variations with weld nugget area.

Therefore it is a general object of this invention to provide a reliable and efficient process for the areal inspection of autogenous welds in sheet metal sandwich structures by exhibition of subsurface microstructure variations.

Another general object is to provide a composition for use in the areal inspection of autogenous welds, which composition is inexpensive, highly sensitive, and yields a permanent record of the inspection information.

A more specific object is to provide an inspection method sensitive to subsurface microstructure variations to exhibit the total area of resistance weld nugget bond between contiguous components within a given area of an alloy steel sheet metal sandwich structure.

Another specific object is to provide a unitary composition for use in the inspection of autogenous welds in alloy steel workpieces which composition in its initial state may be applied flexibly to conform to workpiece surface distortions and to produce an indication of weld nugget parameters, and which composition in its final state retains such confirmation and indications for recordation of the inspection information.

A further more specific object is to provide an inspection method and system for the continuous areal inspection of autogenous welding of alloy steel, sheet-metal, sandwich structure panels during their production and providing for the immediate display of such inspection information and the permanent recordation thereof.

According to an illustrated embodiment of this invention the process for areal inspection of autogenous welds in alloy steel sandwich structures comprises the steps of applying a local magnetic field to the workpiece of sufficient strength to exhibit magnetic permeability differences between areas of different microstructure in the workpiece, applying a dispersion of a magnetic particle dispersoid in a liquid dispersant to the surface area of the workpiece to be inspected, settling the dispersoid according to microstructure permeability variations within the workpiece, hardening the dispersant, stripping the hardened dispersant as a unit and containing the settled magnetic particle dispersoid from the surface of the workpiece, and scanning the stripped, hardened dispersant containing the settled magnetic particle dispersoid. The dispersion composition according to a preferred embodiment of this invention comprises a magnetic metal particle dispersoid dispersed in a low viscosity dispersant, the dispersant includes a volatile solvent and a stable cohesive solute, the solvent includes a wetting agent and a nontoxic dilutent, the total volume of solute being greater than the total volume of the dispersoid.

Features of the invention desired to be protected herein are pointed out with particularity in the appended claims. However, the invention itself, together with further objects and advantages thereof, may best be understood by reference to the following description, taken in connection with the accompanying drawings in which:

FIGURE 1 is a partially sectionalized perspective view of a sheet metal sandwich structure;

FIGURE 2 is a sectionalized view illustrating the resistance welding fabrication of the structure of FIG. 2;

FIGURE 3 is a diagrammatic representation of magnetic induction in a workpiece;

FIGURE 4 illustrates a permanent recording of inspection information according to this invention; and FIGURE 5 is a simplified illustration of a complete inspection system according to the process of this invention.

Referring now to FIGURE 1, a sheet metal sandwich structure may comprise first and second corrugated core components 10 and 12 and planar skin components 14 and 16, all of sheet metal. The usual fabrication procedure is initiated by attachment of the core components 10 and 12 along faying surfaces 18 by resistance welding, preferably roller welding. Thereafter, skins 14 and 16 are placed in position relative to the fabricated core and resistance welds are produced at spaced welding positions along faying surfaces 20 and 22. Successive welding positions for skin 14 are indicated graphically at 24. The latter welding positions, for applications such as airfoil structures, must not exhibit surface distortion. Therefore, at least at the external welding positions, there can be no visible indication of the existence of subsurface welds along faying surfaces 20 and 22.

FIGURE 2 explains in more detail the series welding operation by which external skins 14 and 16 are attached simultaneously to the prefabricated core components 10 and 12. It is usually preferable to employ a mandrel 26 to span each of the longitudinal voids in the core for transmitting welding pressure and current between welding electrodes 28 and 30. In a continuous operation mandrels 26 are fixed at one end, to the right in the drawing, and free at the opposite end 32. Prefabricated core sections enveloping the mandrels are fed toward roller welder electrodes 28 and 30 and, simultaneously, planar skins 14 and 16 are fed from stock rolls, not shown. By means of conventional roller welder controls, welding current is passed intermittently between electrodes 28 and 30 so that spaced welds 34 and 36 are made along longitudinal faying surfaces 20 and 22 between the skin and core components. By employing duplicate sets of roller welder electrodes arranged laterally of the direction of workpiece feed, any desired panel width may be produced in a continuous process.

With further reference to FIGURE 1, the welds produced at welding positions 24 are attachment or stabilizing welds. This nomenclature is adopted to distinguish from structural welds and to point up the fact that the efficacy of sandwich structure fabrication depends not upon the properties of any single weld but upon the total strength contributed over an area by many attachment welds. The purpose of the attachment welds is to stabilize the sandwich structure and to resist shearing forces between the components thereof. For a given sandwich structure design, a figure of merit may be prescribed in terms of the ratio of the total weld nugget area along interfaces between two workpiece components, to the area subtended on the plane of the interfaces by those workpiece components. It is understood, of course, that the use of such a figure of merit presupposes that weld areas will be reasonably equally distributed.

As is known, metals generally are crystalline in nature and exhibit a granular microstructure. In an unstressed state the granular microstructure most commonly comprises polyhedral grains which are more or less symmetrical or equiaxial. Workpiece components however, especially sheet metal components, having been exposed to the mechanical and thermal stresses of stock preparation, exhibit distorted non-equiaxial grains and, at times, amorphous laminations and dendritic configurations. The microcrystalline structure of the stock material, however, is significantly altered within the fused volume of a weld nugget. There the microstructure assumes a radial columnar configuration which is especially evident in the vicinity of the interface between fused and unfused zones. In short, the portion of the stock metal which has been melted and solidified assumes an altered granular microstructure.

As has been pointed out hereinbefore, magnetic permeability of a metal is dependent upon its granular microstructure. Correlation, therefore, may be made between areal extent of the weld nugget bonding and magnetic permeability when sufficiently sensitive means are employed for sensing the magnetic permeability patterns. It should be noted however, that these magnetic permeability patterns are not dependent upon any mechanical or physical alteration of the parent metal of the type produced by voids, cracks or adulterants. In autogenous welding there is no contribution to the weld nugget of any metal except that of the stock (parent) metal of the workpiece.

According to this invention, microstructure permeability variations are detected by means of a unique magnetic particle dispersion which is applied to the workpiece surfaces in the presence of a magnetic field generated within the workpiece. This environmental magnetic field is affected internally and externally of the workpiece by variations of magnetic permeability within the workpiece. Settle patterns formed from the magnetic particle dispersion correspond therefore to subsurface magnetic permeability variation patterns.

Magnetic particle inspection dispersions, generally, comprise a dispersoid in the form of a finely divided ferromagnetic material and a dispersant solution. For the inspection of macroscopic effects, the workpiece is subjected to a local magnetic field and submerged in a shallow bath of the dispersion until settle patterns form upon separation of the dispersoid from the dispersion. Defects are determined by visual inspection and are recorded by marking upon the workpiece itself or by some independent method. The workpiece is then removed from the bath. No significant alteration of the properties of the dispersion components accompanies this procedure. Alternatively, dispersions have been formed utilizing a volatile dispersant for employment in a method whereby, after application of the dispersion to a workpiece, the dispersant is evaporated leaving any settle patterns to be supported only by the workpiece. Neither of these methods can be applied practically to areal workpiece inspection where it is necessary to provide for non-transient use and storage of settle patterns removed from the inspection workpiece.

To overcome the above deficiencies the unique magnetic particle dispersion of this invention, as particularly adapted to be permanent recordation of areal inspection information, includes a magnetic particle dispersoid and, as a dispersant, a fluid composition adapted to yield a solid residue at a determinable stage in an inspection process. As a preferred example, the dispersant comprises a solution including a volatile solvent and a hardenable stable solute. Upon exposure of a workpiece coated with this dispersion to ambient atmospheric conditions, the solvent is volatilized allowing the solute to solidify and to thus immobilize any magnetic particle settle pattern formed upon a workpiece surface. The solute in its hardened state may be then stripped from the workpiece surface without significant dimensional distortion so as to provide a separate and permanent record of the inspection information presented by the settle patterns.

An advantageous formulation of the preferred dispersion comprises:

Solvent—Ethyl alcohol (50% by vol.) _____ 150 cc.
Solute—Polyvinyl alcohol (resin) _____ 90 cc.

Total disperant _____ 240 cc.
Dispersoid—Iron oxide $Fe_3O_4$, powder (300 mesh) .4 gr.

The above dispersant will have the approximate viscosity of Saybold 85 seconds at 85° F. and, with the 300 mesh dispersoid, may be conveniently applied as an aerosol spray. Nitrogen at 100 p.s.i. has been found suitable as an aerosol propellant.

For other methods of application to a workpiece, as by flooding or immersion, viscosity may be readily adjusted by suitable variation of the polyvinyl alcohol concentration. Particle size is determinant of the settling time of the dispersoid, assuming that a uniform dispersion is maintained by agitation before application. The time for solidification is a function of the ethyl alcohol concentration under given ambient conditions but solidification may be accelerated by the application of heat, air circulation about the workpiece, and other external drying aids. Of course, the thickness of the applied coating is a principal factor in controlling solidification.

Additional advantages may be achieved by the use of certain additives to the basic dispersant formulation. Glycerine is a suitable wetting agent for the dispersoid and when dissolved (reagent grade, 5 cc.) in the above dispersant solution (240 cc.), it provides a desirable effect in lessening adhesion between solute residue and workpiece surface. In some cases it will be useful to add a water soluble die to the dispersant solution to provide a contrasting background for the black iron oxide dispersoid.

Additional examples of fluid compositions for the dispersant of the dispersion of this invention include thermoplastic and thermosetting plastics maintained in a fluid state until settle patterns are formed and then allowed to harden or artificially hardened to yield a solid residue immobilizing inspection information in a separable and permanent record.

Referring now to the diagrammatic representation of FIGURE 3, a metallic specimen 38 is shown coated with a magnetic particle dispersion 39, described hereinabove. The speciment 38 exhibits a magnetic permeability greater than that of the dispersion, and with the dispersion, is subjected to a local magnetic field as indicated by lines of magnetic induction g. It may be assumed that the magnetic field is that produced by a long, uniform, solenoid arranged symmetrically about the section shown in the figure.

Within a given region of a magnetic field, the magnetic induction, or flux density, B is related to the magnetic field intensity H according to the relationship: $B=\mu H$ where $\mu$ is the magnetic permeability of the region. If H is measured in oersteds, B is in gauss units. One gauss is equivalent to one line of magnetic induction per square centimeter of area perpendicular to the field. Hence, in the cross section of FIGURE 3, the value of magnetic induction is indicated by the spacing between the lines g. The lines crowd together in a region where magnetic induction is greater and indicate, in a field of otherwise uniform intensity, the presence of a region of greater magnetic permeability.

The magnetic inductance configuration shown is for a specimen 38 which has an increased magnetic permeability within region b relative to a constant value of permeability within regions a and c. This permeability pattern is substantially that which would accompany an alteration of the granular microstructure of a stock workpiece due to the production of an autogenous weld nugget within region b.

Variations of the magnetic permeability of specimen 38 affect the magnetic induction within its environment also, so that the lines of magnetic induction g' in the dispersion 39 are concomitantly altered. Within the regions a and b the magnetic permeability has the uniform value of the parent metal of the specimen. Therefore, lines g' and g'' are parallel with the axis of the magnetic field in these regions. Within the region b, however, where the magnetic permeability has been increased (i.e. due to the production of a weld nugget), the lines g'' approach one another and lines g' turn toward the field axis.

The tangent to a line of magnetic induction indicates the direction that a magnetized particle is urged to take by the magnetic force field, either in the direction of the field or in the opposite direction depending upon the polarization of the particle. Settling of dispersed magnetic metal particles 40 will therefore be affected by the magnetic field in proportion to the vertical components of the lines of magnetic induction. Consequently, a denser concentration of particles will form on the surface of specimen 38, as at 41, outlining the area of increased magnetic permeability within the specimen. The useful result is, therefore, the production of a settle pattern corresponding in surface area to the area on a parallel plane of a weld nugget causing the permeability variation.

For the purposes of this invention it is essential that the dispersion medium dispersant, of dispersion 39 exhibit: (1) an initial, metastable fluid state to facilitate the settling of dispersed particles 40 into settle patterns 41; and (2) a final, stable residual state for the independent preservation of the dispersoid settle patterns 41.

FIGURE 4 illustrates a lift or recording 42 taken from the surface of a resistance welded sheet-metal sandwich structure component such as skin 14 in FIGURE 1. The lift 42 is the congealed solute or residue of a dispersion according to this invention and contains the dispersoid settle patterns as at 43, 45 and 47. These patterns were formed when the dispersoid magnetic particles of the dispersion were allowed to settle from a random distribution in the presence of a local magnetic field encompassing the workpiece. Patterns 43, 45, 47 may be related to standard patterns concomitant with the formation of satisfactory weld nugget bonds at corresponding welding positions in a prototype structure.

The patterns 43 of region x of the recording 42 may be taken as indicating satisfactory welding conditions and are contrasted with the attenuated patterns 45 of region y. As explained hereinbefore, the efficacy of attachment welds in sandwich structure fabrication is a function of the total weld nugget area within a given workpiece area. A summation of the areas indicated by settle patterns 43 within a unit area of region $x$ if equal to or greater than a figure of merit predetermined for the prototype would indicate that fabrication is proceeding satisfactorily. However, when summation of the areas subtended by patterns 45 yields a total attachment area less than that required, welding procedures must be corrected. Satisfactory correction is indicated where the patterns 47 of a subsequent region $z$ indicate a total nugget bond area per unit of surface area again exceeding the established figure of merit.

Approximate qualitative evaluation of the recording can be accomplished visually. However, automatic scanning and integrating means may be preferable in some cases. Since the lift is removed from the workpiece, conventional photometric scanning equipment may be conveniently employed to produce a calibrated read-out or, simply, an indication that a desired figure of merit is or is not being exceeded.

Referring now to FIGURE 5, there is illustrated schematically a production line system according to this invention for the areal inspection of autogenous welds in sheet metal sandwich structures. For purposes of illustration, the system may best be described as a sequence of operations at successive stations, progressing from right to left in the drawing. The sandwich structure comprises assembled core components 10 and 12 and top and bottom skin sheets 14 and 16. These components have been arranged in a manner illustrated by means of forming apparatus, not shown, to the right of the sight.

First station includes welding apparatus illustrated as a pair of roller welder electrodes 38 and 30 for making the series welds for attaching the top skin 14 and the bottom skin 16 to the core components 10 and 12. Continuous progression of the workpiece is maintained so that the welded areas pass through a second station comprising magnetic field coils 50 and 52, several turns of a heavy conductor, for example, through which a relatively high current is maintained to produce a substantial local, and controllable magnetic field in the vicinity of the workpiece. The workpiece then passes through a third station which may be intermediate of the coils 50 and 52 and which comprises apparatus such as aerosol dispensers 54 and 56 for application of the magnetic particle dispersion according to this invention. Sprays 58 and 60 are directed toward the surface of skins 14 and 16 at a rate of flow adjusted in proportion to the speed of the workpiece to produce sufficiently thick films 62 and 64. The workpiece thereafter progresses to a fourth station where the hardened dispersion residue is stripped from the workpiece by means of scraper knives 66 and 68. The distance between the spraying and film removal stations is adjusted to allow sufficient time for settling of the magnetic particle dispersoid and subsequent hardening of the dispersant solute. The workpiece continues toward the left in the illustration for whatever further processing is desired.

The stripped, hardened films containing the magnetic particle patterns related to the magnetic permeability variations in the workpiece are next presented to inspection station apparatus, for example, light sources 70 and 72 and photometers 74 and 76. A final storage station comprises apparatus such as take up rolls 80 and 82. Idler rolls 78 are illustrative of means for directing the stripped film after its removal from the workpiece.

Various modifications of the basic system of FIG. 5 will be immediately apparent. In certain instances it may be desirable for the inspection stations to be manually operated when visual inspection will suffice. However, since the ratio of a normal particle pattern area to the area of the stripped film may be predetermined, the photometric apparatus may readily be included in signalling lockout or feed back control circuitry to either signal unsatisfactory welding conditions or to accomplish necessary adjustments in the welding conditions during production to maintain satisfactory ratios of weld nugget area to workpiece area. Most stock workpieces, such as the alloy-steels, do not exhibit significant magnetic remanence, and for such materials the first coil 50 may be omitted from the system. On the other hand, for materials which do exhibit significant magnetic remanence, the action of the second coil 52 may only be cumulative. Of course, suitable permanent magnets may be substituted for the solenoids 50 and 52 in any case to produce efficient magnetic field intensities (i.e., several hundred to several thousand oersteds). The dispersion application station may comprise other coating means than the aerosol dispensers 54 and 56 shown. Flooding by a constant flow from fan nozzles or passage of the sandwich structure through an immersion bath are advantageous equivalents.

It should be noted that regardless of the immediate qualitative inspection method employed during a production process, the inspection information is permanently recorded for whatever later study is required. Statistical analyses of such records have already led to improvements in welding procedures and have been used as direct proof of the satisfactory operation of welding equipment for certification purposes. The permanent record is of information provided at the time settle patterns are formed and transient phenomena involved in age hardening or air hardening of workpiece materials may be sampled immediately after welding for later consideration and evaluation.

While the above discussion has been directed in the main to certain preferred examples of compositions and processes for inspection of autogenous welds, it is to be understood that these are but illustrative of the application of the principles of the invention. Numerous other arrangements may be devised by those skilled in the art without departing from the spirit and scope of the invention.

What is claimed is:

1. A process for the areal inspection of autogenous welds in a sheet metal sandwich structure to yield immediate and storable inspection information, which process comprises the steps of coating surfaces of the welded structure with a random dispersion comprising a comminuted magnetic particle dispersoid and a dispersant solution of a volatile solvent and a stable cohesive solute, generating within the workpiece and the coating a substantial, local, magnetic field to create magnetic induction configurations in the vicinity of the surfaces related to magnetic permeability configurations within the structure, settling dispersoid particles in the presence of the field into patterns corresponding to the configurations, volatilizing the solvent, stripping the residual solute film containing the patterns from the structure, and photometrically comparing the area of the patterns within portions of the film with the total area of the portions.

2. A process for the areal inspection of autogenous welds in a sheet metal structure to yield immediate and storable inspection information, which process comprises the steps of coating surfaces of the welded structure with a fluid dispersion of a magnetic particle dispersoid and a hardenable dispersant, generating within the workpiece and the coating a substantial, local, magnetic field of the type produced by a solenoid wound about the structure to create magnetic induction configurations in the vicinity of the surfaces related to magnetic permeability configurations within the structure, settling dispersoid particles in the presence of the field into patterns corresponding to the configurations, hardening the dispersant, stripping the hardened dispersant containing the patterns from the structure, and photometrically comparing the area of the patterns within portions of the stripped hardened dispersant with the total area of the portions.

3. The continuous process for areal inspection of autogenous welds during the fabrication of sheet metal workpieces which process comprises the steps of moving a composite workpiece at a constant rate past successive work stations, resistance welding the workpiece at a first work station, applying a dispersion of a magnetic particle dispersoid in a hardenable dispersant upon workpiece surfaces at a second work station, settling the dispersoid in the presence of a substantial local magnetic field into patterns corresponding to magnetic permeability variations within the workpiece at a third work station, hardening the dispersant, stripping the hardened dispersant containing the magnetic particle patterns from the workpiece at a fourth work station, and continually scanning the stripped hardened dispersant at a fifth work station by nonmanual means whereby immediate and continuous inspection information is obtained during the uninterrupted fabrication of the sandwich structure.

4. A process for continuous areal inspection of autogenous welds in sheet metal workpieces which process comprises the steps of moving the workpieces past successive stations, resistance welding the workpieces at a first station, coating surfaces of the workpieces with a dispersion of a magnetic particle dispersoid with a hardenable dispersant at a second station, applying a substantial local magnetic field to the workpieces at a third station, settling the dispersoid in patterns corresponding to magnetic permeability variations within the workpieces in the presence of the magnetic field, hardening the dispersant, and stripping the hardened dispersant containing the magnetic patterns from the workpieces at a fourth station.

5. The process of areal inspection of autogenous welds in sheet metal workpieces which process comprises the steps of coating surfaces of the workpiece with a dispersion of a magnetic particle dispersoid and a hardenable dispersant, passing the welded workpiece through a substantial local, magnetic field, settling the dispersoid into patterns corresponding to magnetic permeability variations within the workpiece in the presence of the field, hardening the dispersant, and stripping the hardened dispersant containing the magnetic particle patterns from the workpiece.

6. The process for producing recordings of areal inspection information pertaining to sub-surface autogenous welds in alloy-steel workpieces which process comprises the steps of coating exterior workpiece surface areas overlaying the welding positions with a random dispersion of a magnetic particle dispersoid in a hardenable dispersant, settling dispersoid particles from the dispersion in the presence of a substantial, local, magnetic field into patterns corresponding to microstructure permeability variations in the vicinity of the welding positions, hardening the dispersant, and stripping the dispersant from the surface of the workpiece.

7. A process for the inspection of permeability variations in a metal workpiece to yield immediate and storable inspection information, which process comprises the steps of coating a surface of the workpiece with a random dispersion comprising a comminuted magnetic particle dispersoid in a dispersant solution of a volatile solvent and a stable cohesive solute, generating in the workpiece and in the coating a substantial, local, magnetic field to create magnetic induction configurations in the vicinity of the surface related to magnetic permeability configurations within the workpiece, settling the dispersoid particles in the presence of the field into patterns corresponding to the configurations, volatilizing the solvent, stripping the residual solute film containing the patterns from the surface and photometrically comparing the area of the patterns within portions of the film with the total area of the portions.

8. A process for the areal inspection of fusion bonds causing permeability variations in otherwise continuous metal workpieces to yield immediate and storable inspection information, which process comprises the steps of coating a surface of a workpiece with a fluid dispersion of a magnetic particle dispersoid and a hardenable dispersant, generating within the workpiece and the coating a substantial, local magnetic field of the type produced by a solenoid wound about the workpiece to create magnetic induction configurations in the vicinity of the surface related to the magnetic permeability configurations within the structure, settling dispersoid particles in the presence of the field into patterns corresponding to the configurations, hardening the dispersant, and stripping the hardened dispersant containing the patterns from the workpiece.

9. The continuous process for areal inspection of welds produced by an electric current during the fabrication of sheet metal workpieces which process comprises the steps of moving a composite workpiece at a constant rate past successive work stations, electrically welding the workpiece at a first station, applying a dispersion of a magnetic particle dispersoid in a hardenable dispersant upon a workpiece surface at a second station, settling the dispersoid in the presence of the magnetic field resulting from the welding into patterns corresponding to magnetic permeability variations within the workpiece at a third station, hardening the dispersant, and stripping the hardened dispersant containing the magnetic particle patterns from the workpiece at a fourth station whereby immediate and continuous inspection information is obtained during the uninterrupted fabrication of the workpiece.

10. The process of areal inspection of fusion bonds causing permeability variations in otherwise continuous metal workpieces which process comprises the steps of coating a surface of the workpiece with a dispersion of a magnetic particle dispersoid in a hardenable dispersant, passing the workpiece through a substantial, local, magnetic field, settling the dispersoid in patterns corresponding to the magnetic permeability variations within the workpiece in the presence of the field, hardening the dispersant, and stripping the hardened dispersant containing the magnetic particle patterns from the workpiece.

11. The process for producing recordings of magnetic particle inspection information related to permeability variations produced in an otherwise continuous workpiece by fusion bonds, comprising the steps of coating a workpiece surface with a random dispersion of a magnetic particle dispersoid in a hardenable dispersant, settling the dispersoid particles from the dispersion in patterns related to permeability variations caused by the fusion bonds, hardening the dispersant, and stripping the hardened dispersant containing the magnetic particle patterns from the workpiece.

12. A dispersion for the areal inspection of autogenous welds in sheet metal workpieces, which dispersion comprises a comminuted magnetic particle dispersoid and a dispersant having a metastable fluid state during a determinable dispersoid settling period and a stable self-supporting residual state thereafter, said dispersion being comprised by volume of 15 parts of 50% ethyl alcohol in water and 9 parts of polyvinyl alcohol resin and said dispersant being comprised of 1 gm. of 300 mesh iron oxide powder per 60 cc. of dispersant, whereby said dispersion may be applied as an aerosol spray.

13. A dispersion for the areal inspection of autogenous welds in sheet metal workpieces which dispersion comprises a comminuted magnetic particle dispersoid and a dispersant having a metastable fluid state during a determinable dispersoid settling period and a stable self-supporting residual state thereafter, said dispersant consisting essentially of, by volume, 30 parts of 50% ethyl alcohol in water, 18 parts of polyvinyl alcohol resin and one part glycerine, and said dispersant consisting essentially of 300 mesh iron oxide powder, whereby wetting of said dispersoid by said dispersant and removal of the dispersant in its stable self-supporting residual state from a workpiece are enhanced.

(References on following page)

References Cited in the file of this patent

UNITED STATES PATENTS

| | | |
|---|---|---|
| 1,889,380 | Reuben | Nov. 29, 1932 |
| 2,057,091 | Eurich et al. | Oct. 13, 1936 |
| 2,418,479 | Pratt et al. | Apr. 8, 1947 |
| 2,433,963 | Tarbox | Jan. 6, 1948 |
| 2,456,313 | Pratt | Dec. 14, 1948 |
| 2,495,544 | Peterson et al. | Jan. 24, 1950 |
| 2,495,545 | Peterson et al. | Jan. 24, 1950 |
| 2,654,681 | Lueck | Oct. 6, 1953 |
| 2,688,649 | Bjorksten | Sept. 7, 1954 |
| 2,751,352 | Bondi | June 19, 1956 |

OTHER REFERENCES

Elvanol.: Pages 35, 37, pub. by E.I. duPont de Nemours & Co., Wilmington, Delaware (19).